United States Patent [19]
Thorne

[11] Patent Number: 6,021,310
[45] Date of Patent: Feb. 1, 2000

[54] COMPUTER PAGER DEVICE

[76] Inventor: Robert Thorne, 127 E. Main St., Riverhead, N.Y. 11901

[21] Appl. No.: 08/940,881

[22] Filed: Sep. 30, 1997

[51] Int. Cl.⁷ ..................................................... H04Q 7/00
[52] U.S. Cl. ....................... 455/31.3; 455/38.4; 455/552; 455/556; 455/557; 455/566; 455/575; 340/825.44; 375/222
[58] Field of Search ..................... 455/550, 552, 455/556, 557, 566, 575, 90, 32.1, 38.1–38.2, 38.4–38.5, 344, 347, 351, 31.3; 340/825.44; 375/222

[56] References Cited

U.S. PATENT DOCUMENTS

| | | | |
|---|---|---|---|
| 4,811,379 | 3/1989 | Grandfield | 455/31.3 |
| 5,117,460 | 5/1992 | Berry et al. | |
| 5,192,947 | 3/1993 | Neustein | 340/825.44 |
| 5,459,458 | 10/1995 | Richardson et al. | |
| 5,463,380 | 10/1995 | Matai | 340/825.44 |
| 5,550,861 | 8/1996 | Chan et al. | |
| 5,628,055 | 5/1997 | Stein | 455/127 |
| 5,634,201 | 5/1997 | Mooring | |
| 5,822,692 | 10/1998 | Krishan et al. | 340/825.44 |

*Primary Examiner*—Doris H. To
*Attorney, Agent, or Firm*—Michael I. Kroll

[57] ABSTRACT

A computerized paging device connected a source of power for transmitting and receiving messages. The computerized paging device includes a modem for transmitting messages to a desired party and receiving message signals transmitted to the device and a microprocessor including a memory unit for storing programming information for the microprocessor is connected to the modem for processing the received message signals and generating a display message signal based upon the processed received message signal. A display screen is connected to the microprocessor for displaying the display message signal. A speaker is connected to the microprocessor for producing an audible representation of the display message signal and a microphone is also connected to the microprocessor for receiving an audible signal, wherein the audible signal is transmitted to the microprocessor for conversion into a digital signal and transmission to the desired party by the modem. A mouse can be connected to the microprocessor for scrolling through the message displayed on the display screen.

8 Claims, 6 Drawing Sheets

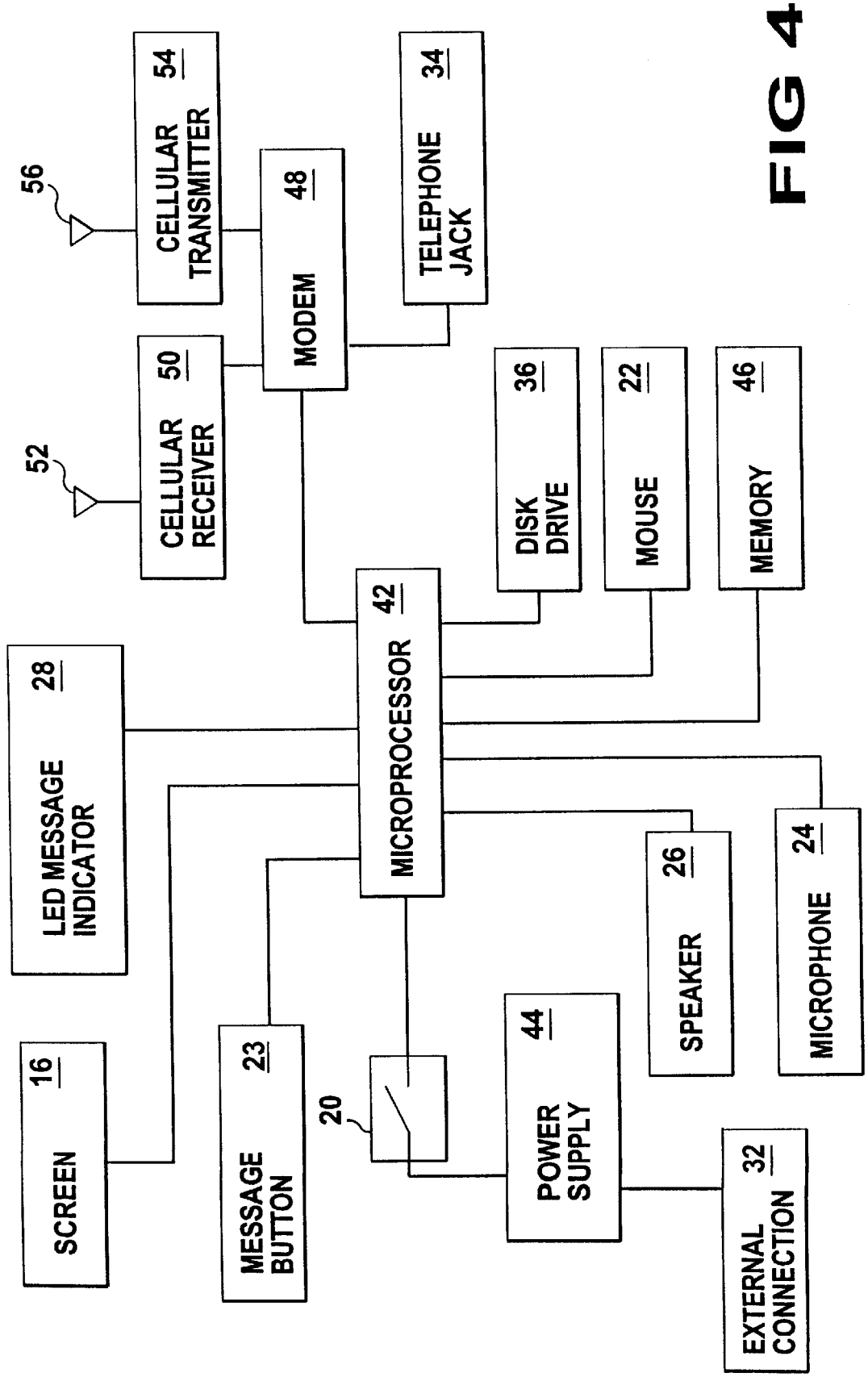

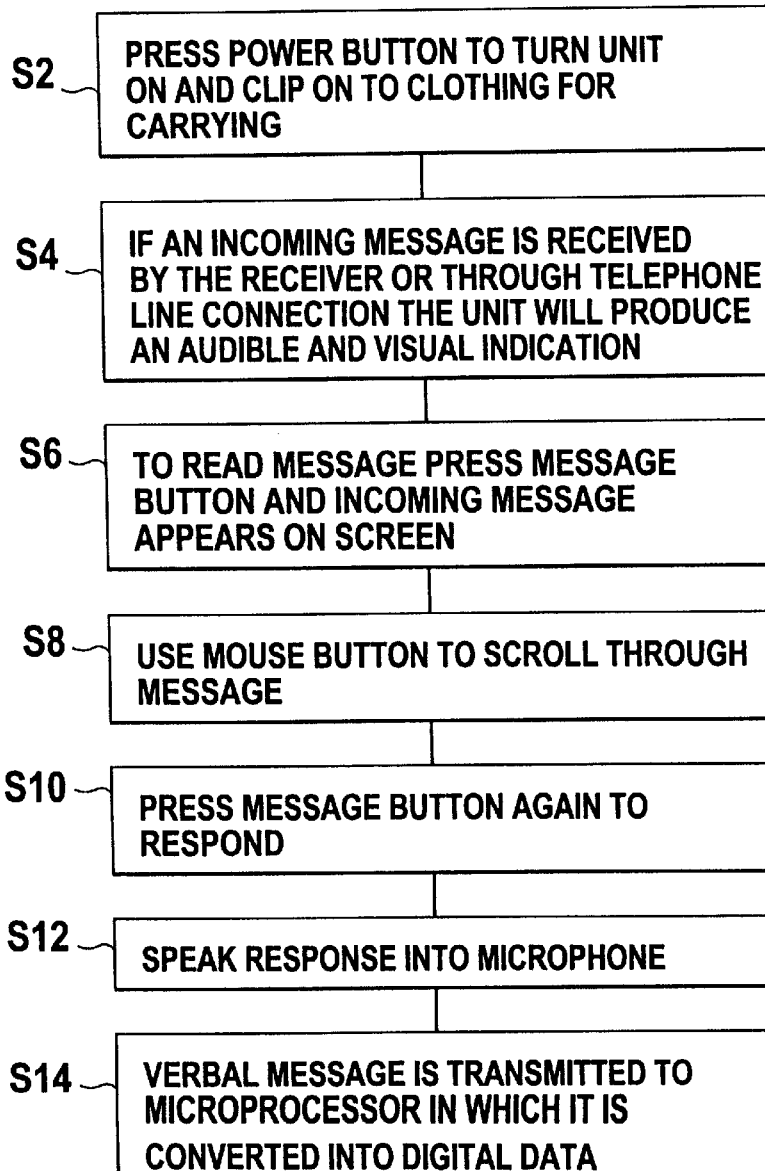

COMPUTER PAGER DEVICE

BACKGROUND OF THE INVENTION

1. Field of the Invention

The present invention relates generally to paging devices and, more specifically, to a computerized paging device able to send and receive messages.

2. Description of the Prior Art

Numerous electrical switches have been provided in the prior art. For example, U.S. Pat. Nos. 5,117,460; 5,459,458; 5,550,861 and 5,634,201 all are illustrative of such prior art. While these units may be suitable for the particular purpose to which they address, they would not be as suitable for the purposes of the present invention as heretofore described.

U.S. Pat. No. 5,117,460

Inventor: Thomas G. Berry et al.

Issued: May 26, 1992

An individual desiring to operate a pager via voice commands sends a message to a repository of voice recognition code books requesting access to a particular code book. The repository device(s) respond by transmitting the code book of that individual to at least one pager, which stores the code book therein. In a second embodiment, each individual operating a pager by voice commands is provided with a code book module, which contains suitable memory storage having at least that operator's code book stored therein. By inserting the code book module (or card) into the pager, that pager becomes at least partially controllable by the voice commands of that operator. The code book module may be easily removed to permit the communication device to be rapidly reprogrammed by inserting the code book of another operator.

U.S. Pat. No. 5,459,458

Inventor: C. Patrick Richardson et al.

Issued: Oct. 17, 1995

A general-purpose data terminal, such as a personal computer, portable computer, notebook computer, personal intelligent communicator, portable wireless terminal and the like employs a radio frequency (RF) modem and is programmed to function as a two-way acknowledge back pager. The general purpose data terminal maintains a table listing of caller identification information and presents this information to the device user upon receipt of a page from an identifiable caller. The device user may respond to the page by selecting one of a plurality of user definable responses to be transmitted back to the caller. If no response is selected the caller will receive a message informing them of the paged party's unavailability.

U.S. Pat. No. 5,550,861

Inventor: Demonder Chan et al.

Issued: Aug. 27, 1996

A computer peripheral is provided that combines the functionality of multiple devices, for example, a pager, a facsimile machine, and a data modem. The computer peripheral is designed as one or more separable modules, or functional components, including a module for interfacing the peripheral to a host computer. At least one of the functional components can be operated either as part of the computer peripheral, or may be separated from the remainder of the computer peripheral and used as a self contained functional module.

U.S. Pat. No. 5,634,201

Inventor: Jonathon E. Mooring

Issued: May 27, 1997

An elongated panel configured in the shape of a visor has its respective left and right rear edges pivotally secured to the respective left and right ends of a band-shaped support member whose rear surface has a curvature to mate with the front of a person's forehead. The vertical orientation of the visor can be adjusted with respect to the band-shaped support member. An elongated strap is secured to the rear surface of the band-shaped support member and it has a plurality of loops secured to its rear surface. A bandanna is threaded through the respective loops and tied at the rear of the wearer's head. A display panel is formed below the visor adjacent its front end and it may have a mirror, a pager, a clock and a battery mounted therein. An audio speaker ear piece may be pivotally mounted adjacent either the left or right edge of the visor. An audio microphone may be pivotally mounted adjacent one of the edges of the visor. A pair of glasses may be supported by structure that is pivotally secured to the left and right edges of the visor. An audio jack is mounted in the visor and it is connected to the microphone and ear pieces. An electrical cord has its one end plugged into the jack and its other end may be connected to an FM transceiver and a cellular phone that may be worn in a shoulder holster by the person wearing the visor.

SUMMARY OF THE PRESENT INVENTION

The present invention relates generally to paging devices and, more specifically, to a computerized paging device able to send and receive messages.

A primary object of the present invention is to provide a computerized paging device that will overcome the shortcomings of prior art devices.

Another object of the present invention is to provide computerized paging device including a display screen for displaying messages and a speaker for audibilizing the received message.

An additional object of the present invention is to provide a computerized paging device able to receive and send e-mail messages.

A further object of the present invention is to provide a computerized paging device including a speaker and microphone for receiving and relaying messages.

A still further object of the present invention is to provide a computerized paging device able to receive an audio signal and convert the audio signal into a digital data signal for transmission.

A yet further object of the present invention is to provide a computerized paging device including a mouse button for scrolling through a received message displayed on the display screen.

An even further object of the present invention is to provide a computerized paging device able to return received messages.

A still further object of the present invention is to provide a computerized paging device including a memory unit for storing programming information for controlling the microprocessor and frequently used telephone numbers for use in calling other telephones and computerized paging devices.

Another object of the present invention is to provide a computerized paging device including a disk drive for use in reprogramming the memory unit.

Another object of the present invention is to provide a computerized paging device that is simple and easy to use.

A still further object of the present invention is to provide computerized paging device that is economical in cost to manufacture.

Additional objects of the present invention will appear as the description proceeds.

A computerized paging device connected a source of power for transmitting and receiving messages is disclosed by the present invention. The computerized paging device includes a modem for transmitting messages to a desired party and receiving message signals transmitted to the device and a microprocessor including a memory unit for storing programming information for the microprocessor is connected to the modem for processing the received message signals and generating a display message signal based upon the processed received message signal. A display screen is connected to the microprocessor for displaying the display message signal. A speaker is connected to the microprocessor for producing an audible representation of the display message signal and a microphone is also connected to the microprocessor for receiving an audible signal, wherein the audible signal is transmitted to the microprocessor for conversion into a digital signal and transmission to the desired party by the modem. A mouse can be connected to the microprocessor for scrolling through the message displayed on the display screen.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

FIG. 4 is a schematic diagram of the computer paging device of the present invention; and FIGS. 5, 5A and 5B are flow charts illustrating the operating process of the computer paging device of the present invention.

DESCRIPTION OF THE REFERENCED NUMERALS

Figure 1:
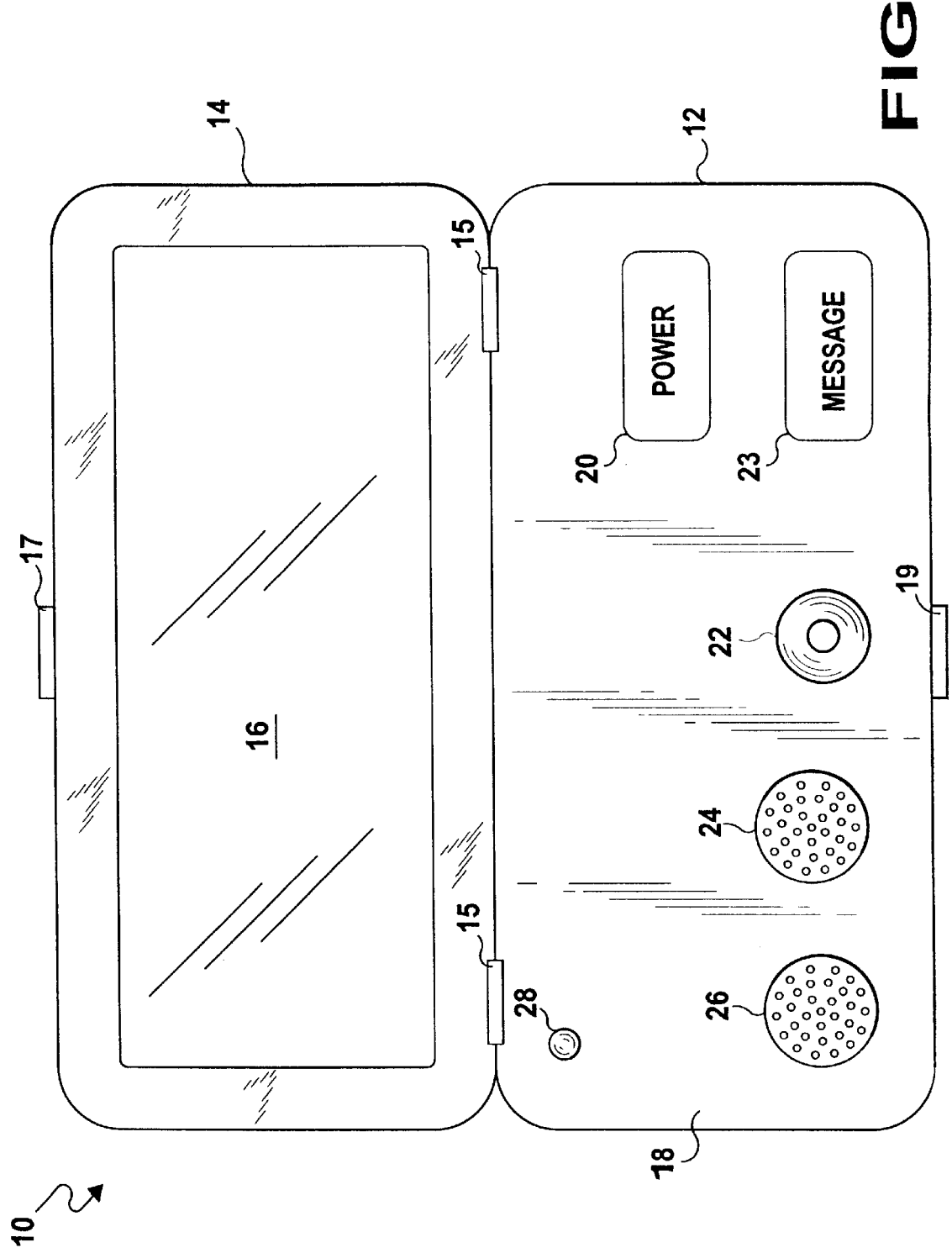
FIG. 1 is a front perspective view of the computer paging device of the present invention.

Turning now descriptively to the drawings, in which similar reference characters denote similar elements throughout the several views, the Figures illustrate the computer paging device of the present invention. With regard to the reference numerals used, the following numbering is used throughout the various drawing figures.

10—computer paging device of the present invention
12—base of the computer paging device of the present invention
14—cover of the computer paging device of the present invention
15—pair of hinges
16—screen
17—latch
18—face side
19—locking mechanism
20—power ON/OFF button
22—mouse
23—message button
24—speaker
26—microphone
28—LED message light
30—side of base unit
32—external power source connection
34—telephone jack connection for optional wired communication
36—disk drive
38—base side
40—clip
42—microprocessor
44—power supply
46—memory
48—modem
50—receiver
52—receiver antenna
54—transmitter
56—transmitter antenna

DETAILED DESCRIPTION OF THE PREFERRED EMBODIMENT

Turning now descriptively to the drawings, in which similar reference characters denote similar elements throughout the several views, FIGS. 1 through 4 illustrate the computerized paging device indicated generally by the numeral 10. The computerized paging device 10 is designed as a small portable hand-held device which may be carried on the belt or waist of a user in the same manner as a conventional pager is transported.

A front view of the computerized paging device 10 in an open position is illustrated in FIG. 1. From this view it is clearly seen that the computerized paging device 10 includes a base side 12 and a cover 14. The cover 14 includes a screen 16 for display and viewing of a received message. The cover 14 is pivotally connected to the base 12 by a pair of hinges 15. When the cover 14 is pivoted towards the base 12, a latch 17 and locking mechanism 19 combination will act to lock the cover 14 to the base 12 thereby maintaining the computerized paging device 10 in a closed position.

The base 12 includes a face side 18 on which is positioned a power ON/OFF button 20, a mouse 22 and a message button 23. The power ON/OFF button 20 will switch the computerized paging device 10 between on and off operating modes while the mouse 22 allows a user to scroll along the display screen 16 to view an entire message and the message button 23 allows the user to display a message or initiate transmission of a message. A speaker 24 is provided on the face 18 of the base 12 for audibilizing a received message or producing an audible indication that a message has been received and a microphone 26 is provided for receiving an audible message from the user for transmission as will be explained hereinafter. An LED message light 28 is also positioned on the face 18 of the base 12 to provide a visible indication that a message has been received by the computerized paging device 10.

Figure 2:
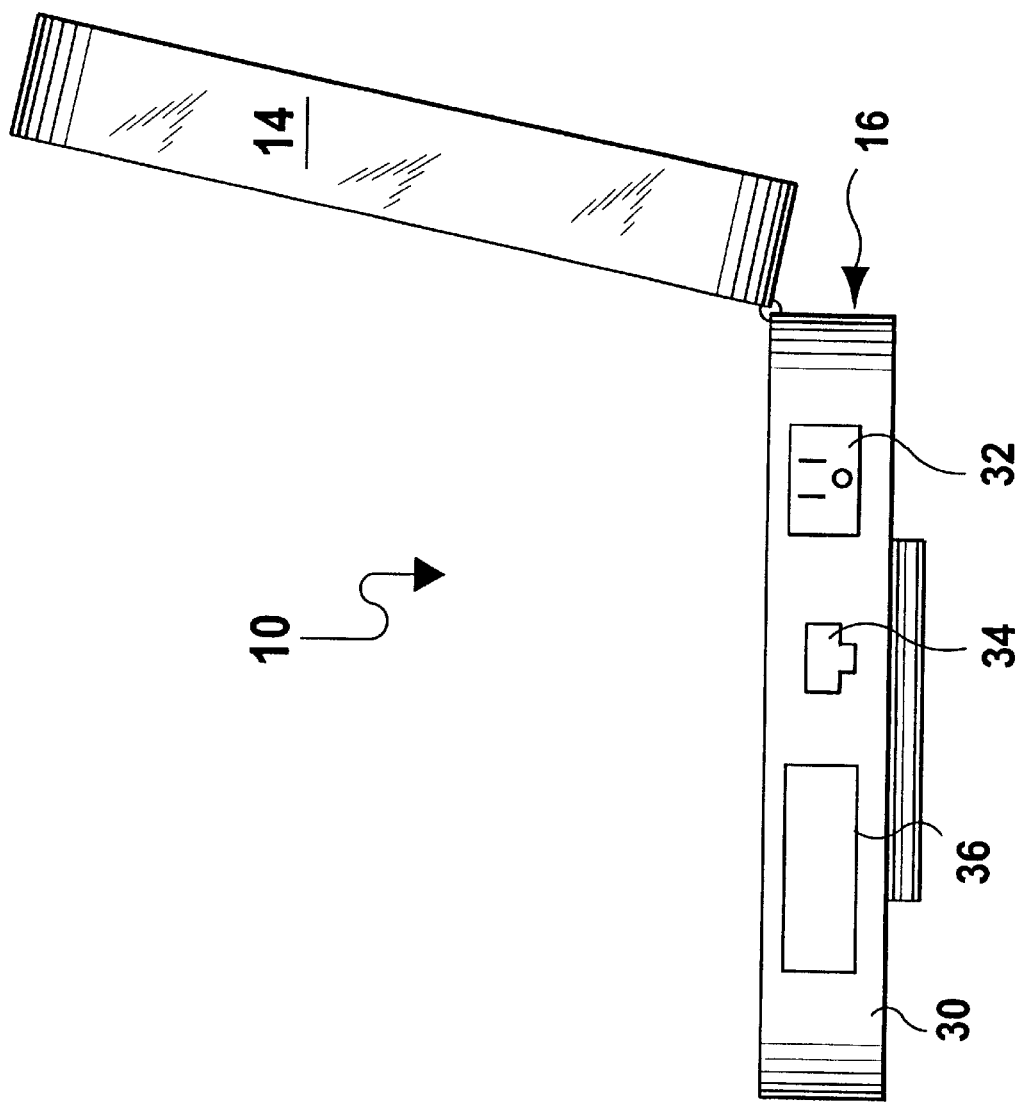
FIG. 2 is a perspective view of a first side of the computer paging device of the present invention.

A side view of the computerized paging device 10 is illustrated in FIG. 2. As can be seen from this view, the computerized paging device 10 includes a power source adapter 32 for connection of the computerized paging device 10 with an outside power source or for connecting the internal power source to a charging unit for recharging the internal power source. A telephone line connection jack 34 is also provided for connection to a conventional telephone line and transmission of messages through the telephone line as an alternative to cellular communication. A disk drive 36 is also provided for transferring data to a memory unit within the computerized paging device 10 or for reprogramming the memory unit. These connection ports 32, 34 and 36 are illustrated as being positioned on one side for purposes of example only and not meant to be limiting on the scope of the invention. In practice these connection ports can be positioned on any side of the device in any configuration as desired.

Figure 3:
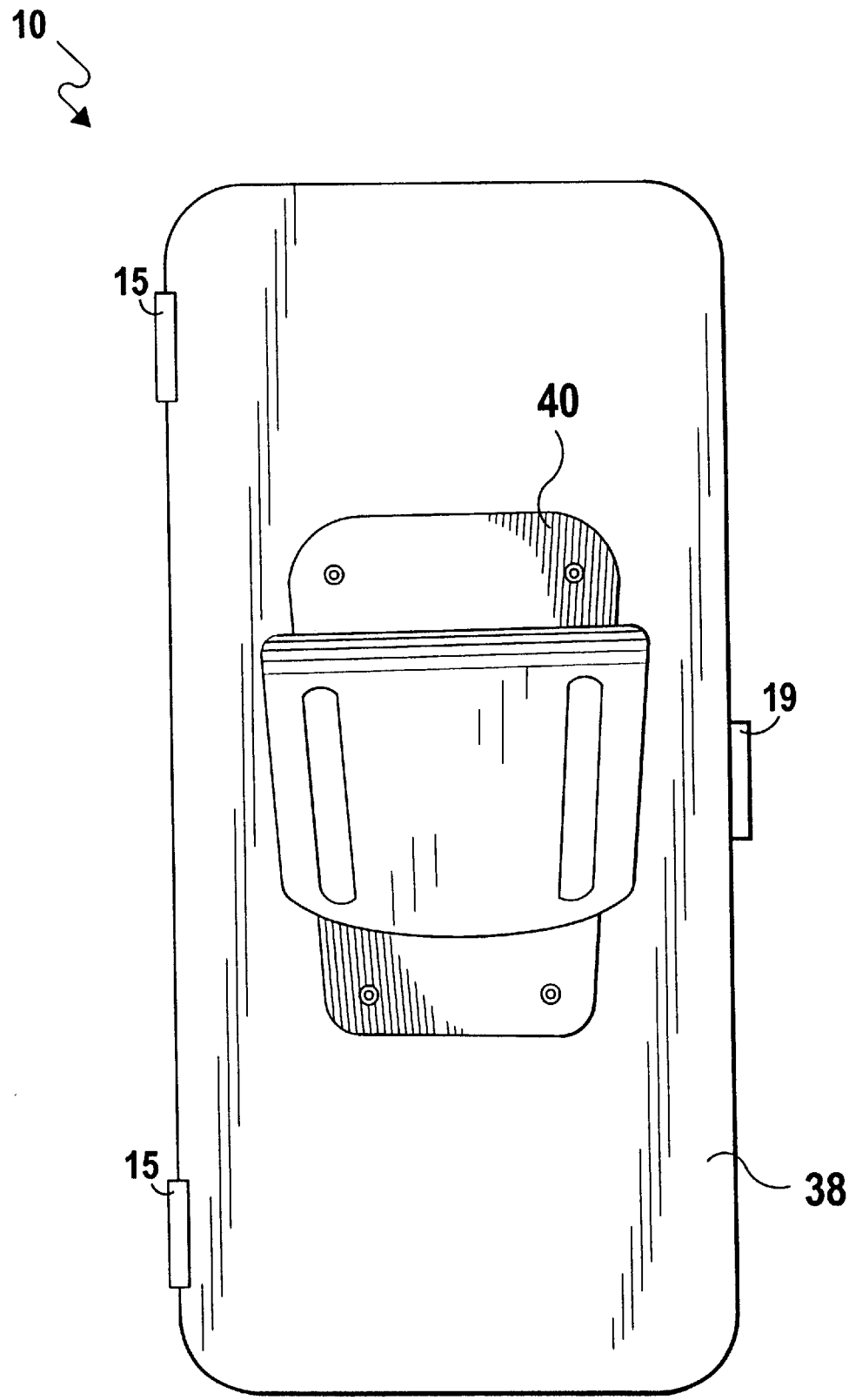
FIG. 3 is a bottom perspective view of the computer paging device of the present invention.

FIG. 3 illustrates a back side 38 of the computerized paging device 10. The back side 38 includes a clip device 40 positioned thereon for connection to a belt or waist material of a user's clothing. The clip device 40 will be strong enough to support the weight of the computerized paging device 10 when attached to the clothing of the user. The clip device 40 must also be easily removed from its attachment to the user's clothing for readily using the computerized paging device 10 while grasping the user's clothing strongly enough so as not to fall off unintentionally or upon accidental pressure being applied thereto.

A schematic box diagram of the internal components of the computerized paging device 10 is illustrated by FIG. 4. From this figure it can be seen that the operation of the device is controlled by a central microprocessor unit 42. The microprocessor unit 42 is connected to the power source 44 via the power ON/OFF button 20 or switch. When the power ON/OFF button 20 is activated the switch will close connecting the power supply 44 to the microprocessor 42 and turning the computerized paging device 10 on. The power ON/OFF button 20 is a pressure operated switch which is activated by applying pressure thereto by a user. If the power ON/OFF button 20 is reactivated by applying pressure thereto the switch will open disconnecting the power supply 44 to the microprocessor 42 and turning the computerized paging device 10 off. Also connected to the power supply 44 is the external connector 32 for connection of an external power supply to either provide an alternative power source for the computerized paging device 10 or to recharge the power supply 44.

A modem 48 is also connected to the microprocessor 42 for use in transmitting and receiving signals under the control of the microprocessor 42. The modem 48 is adapted for either wired or cellular communication. A telephone line connection jack 34 is connected to the modem 48 for connection of the computerized paging device 10 to an external telephone line for wired telephone communication. A cellular receiver 50 including a receiver antenna 52 is also connected to the modem 48 along with a cellular transmitter 54 having a transmitting antenna 56 providing the modem 48 with cellular communication capabilities. The microprocessor 42 will monitor the current at the telephone line connection jack 34 to determine if a telephone line is connected to the modem 48. If it is determined that a telephone line is connected to the telephone line connection jack 34 the modem 48 will communicate using the telephone line connected thereto. Otherwise, the modem 48 will communicate using the cellular receiver 50 and cellular transmitter 54. The modem 48 determines if a telephone line is connected to the telephone line connection jack 34 by sensing the current present at the telephone line connection jack 34. When a message is received by the receiver antenna 52 and cellular antenna 50, it is transmitted through the modem 48 to the microprocessor 42. The LED message indicator 28 is also connected to the microprocessor 42 and is activated by the microprocessor 42 to provide a visual indication that a message has been received. The LED message light is controlled by the microprocessor 42 to either remain illuminated when a message is received or to blink indicating the number of messages received. The microprocessor 42 is also connected to the message button 23 and the display screen 16 whereby, when a message is received and the message button 23 is activated, the received message is displayed on the display screen 16. The message button 23 is also a pressure operated switch which is activated by applying pressure thereto by a user. The mouse 22 is also connected to the microprocessor 42 and is used to scroll through the message displayed on the display screen 16. A speaker 26 is also connected to the microprocessor 42 to provide an audible representation of the received message.

The disk drive 36 and memory unit 46 are also connected to the microprocessor 42. The memory unit 46 stores all data and programming used in controlling the operation of the by the microprocessor 42 and the disk drive 36 is used to either input data to the memory unit 46 or to reprogram the memory unit 46. A microphone 24 is connected to the microprocessor 42 for inputting either a new message for transmission to another party or a response to a received message. When the user speaks into the microphone 24, an analog signal representative of the user's speech is transmitted to the microprocessor 42 in which it is converted into a digital signal for transmission to another party.

Figure 5B:
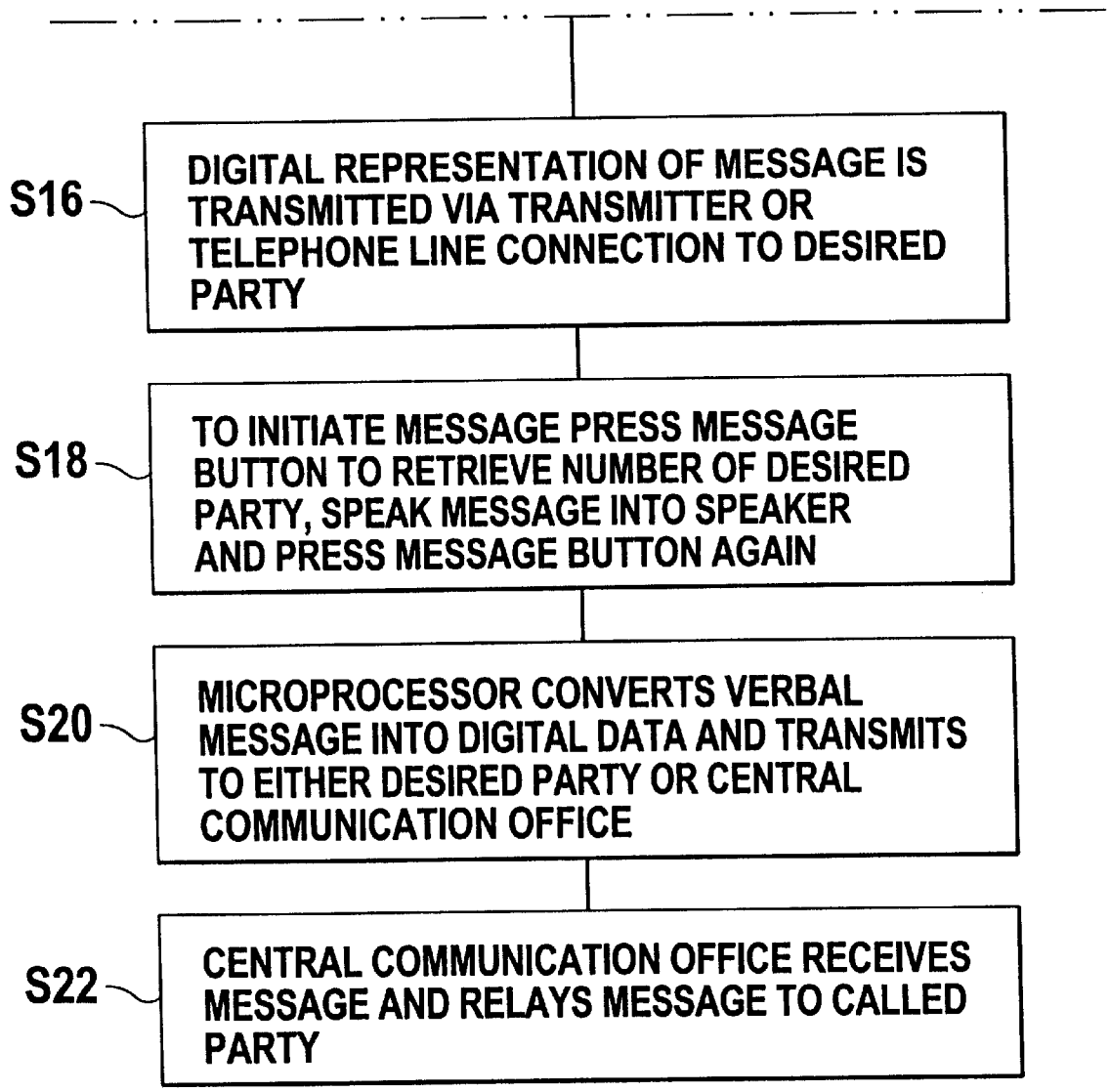

The operation of the computerized paging device 10 will now be described with reference to the figures and specifically FIG. 5. In operation, the power supply 44 of the computerized paging device 10 is charged by connecting an external power source to the external connection 32. Alternatively, an external power source can be used as the main source of power for operation of the computerized paging device 10 by connecting to the external power connection 32. Once the power supply 44 is charged, the power ON/OFF button 20 is activated by pressing it to turn the computerized paging device 10 on. The computerized paging device 10 is then clipped onto the clothing of the user for transport as described in step S2. Prior to the first use of the computerized paging device 10 the microcomputer 42 must be programmed with operating programs instructing the microcomputer 42 how to process the data received through the receiver 50 and microphone 24 and how to output the received data to the transmitter 54, display screen 16, LED message indicator 28, and speaker 26. These instructions are in the form of a computer software program which will be stored in the memory unit 46. This software can be entered for storage in the memory unit 46 in the factory upon manufacturing or may be contained on a computer diskette which can be placed in the disk drive 36 for copying to the memory unit 46. The user may also then store desired or frequently called telephone numbers in the memory unit 46 under the direction of the software program installed therein.

The user may now carry the computerized paging device 10 along and be prepared to receive messages as they are transmitted. If it is desired to use a wired communication interface a telephone line is connected to the computerized paging device 10 through the telephone jack 34.

When an incoming message is received by the modem 48 through either the cellular receiver 50 via the receiver antenna 52 or the telephone line connected to the telephone line connection jack 34, an audible indication is produced through the speaker 26 and a visual indication is produced by illuminating the LED message indicator 28 as stated in step S4. The modem 48 is able to determine if a telephone line is connected to the telephone line connection jack 34 by sensing a current level at the telephone line connection jack 34 and thus adapt to receive messages either through wired or wireless communication methods.

In order to read the received message the user must remove the computerized paging device 10 from its position clipped to the clothing and open the latch mechanism 17 and 19. The user will then activate the message button by pressing it. The microprocessor 42 will then process the received message to generate a processed message signal. The processed message signal will be transmitted for viewing on the display screen 16 as described in step S6. Should the entire message not be able to fit on the display screen 16, the user may use the mouse 22 to scroll through the message as stated in step S8. The mouse 22 controls a cursor appearing on the display screen 16 and includes a push button for placing the cursor in a desired position on the display screen 16. The mouse 22 is controlled by hand to move the cursor around the screen in the same manner as a conventionally known mouse. The mouse 22 may also be in the form of a touch pad, a rotating ball or any other known form of controlling a cursor on a display screen 16.

Should the user wish to respond to the message, the message button 23 is activated again by applying pressure thereto as described in step S10. Next, the user will speak into the microphone 24 verbalizing the message wished to be transmitted as stated in step S12. This verbal message is transmitted to the microprocessor 42 in which it is converted into a digital data signal for transmission to the desired party and the digital data signal is transmitted to the desired party. The transmission is via a wired communication if the telephone line is connected to the telephone line connection jack 34 or via the cellular transmitter 54 and transmitting antenna 56 if the telephone line is not connected to the telephone line connection jack 34 as discussed in steps S14 and S16.

To initiate transmission of a message originating at the computerized paging device 10 the message button is pressed to retrieve a telephone number of the desired party. Pressing the message button will provide a list of the numbers stored in the memory unit 46 and the user will then scroll down the list to retrieve the desired number. Upon finding the desired number, the cursor is placed next to the number and the message button 23 is pressed again as discussed in step S18. The user will then speak into the microphone 24. The verbal message will be transmitted to the microprocessor 42 in which it will be converted to a digital data signal for transmission to either the desired party at the chosen telephone number or to a central communication office as stated in step S20. If transmission was to the central communication office, the central communication office will then relay the message to the desired party as described in step S22.

A system of computerized paging devices 10 which communicate with each other can be formed by providing either direct communication between the individual computerized paging devices 10 or the establishment of a central communication office. The central communication office will receive message signals from the individual computerized paging devices 10. The message signals will include identification data identifying the calling party and the party being called.

From the above description it can be seen that the computerized paging device of the present invention is able to overcome the shortcomings of prior art devices by providing a computerized paging device including a display screen for displaying messages and a speaker and microphone for receiving and relaying messages. The computerized paging device is able to receive and send e-mail messages and convert a received audio signal into a data signal. The computerized paging device also includes a mouse button for scrolling through a received message and is able to return the received messages. Furthermore, the computerized paging device of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A computerized paging device connected to a source of power for transmitting and receiving messages, said computerized paging device comprising:
   a) a modem for transmitting messages only in the form of digital data signals to a desired party and receiving message signals transmitted to the device;
   b) microprocessor means connected to said modem for processing said received message signals and generating a display message signal based upon the processed received message signal;
   c) display means connected to said microprocessor means for displaying said display message signal;
   d) speaker means for producing an audible representation of said display message signal;
   e) microphone means connected to said microprocessor means for receiving an audible signal and converting said audible signal into a digital data signal for transmission to the desired party by said modem;

f) said modem including a telephone line connection jack and cellular transmission means for sending outgoing signals via the cellular transmission means when no current is sensed at said telephone line connection jack; and g) a message button for signaling said microprocessor means to display a received message on said display means and to begin transmission of a message.

2. The computerized paging device as recited in claim 1, wherein said microprocessor means includes a memory unit for storing software instructions for controlling operation of said microprocessor means.

3. The computerized paging device as recited in claim 2, wherein said memory unit stores addresses for use in accessing devices to which it is desired to transmit messages.

4. The computerized paging device as recited in claim 3, wherein said device further includes a disk drive for use in reprogramming said memory unit.

5. The computerized paging device as recited in claim 1, further comprising a mouse for use in scrolling through said message displayed on said display means.

6. The computerized paging device as recited in claim 1, further comprising a message indicator connected to said microprocessor means for producing a visual signal upon receipt of a message signal by said microprocessor means.

7. The computerized paging device as recited in claim 6, wherein said message indicator is an LED.

8. The computerized paging device as recited in claim 1, further comprising a power source connection means for connection of an external power source to the device.

* * * * *